Figure 1:
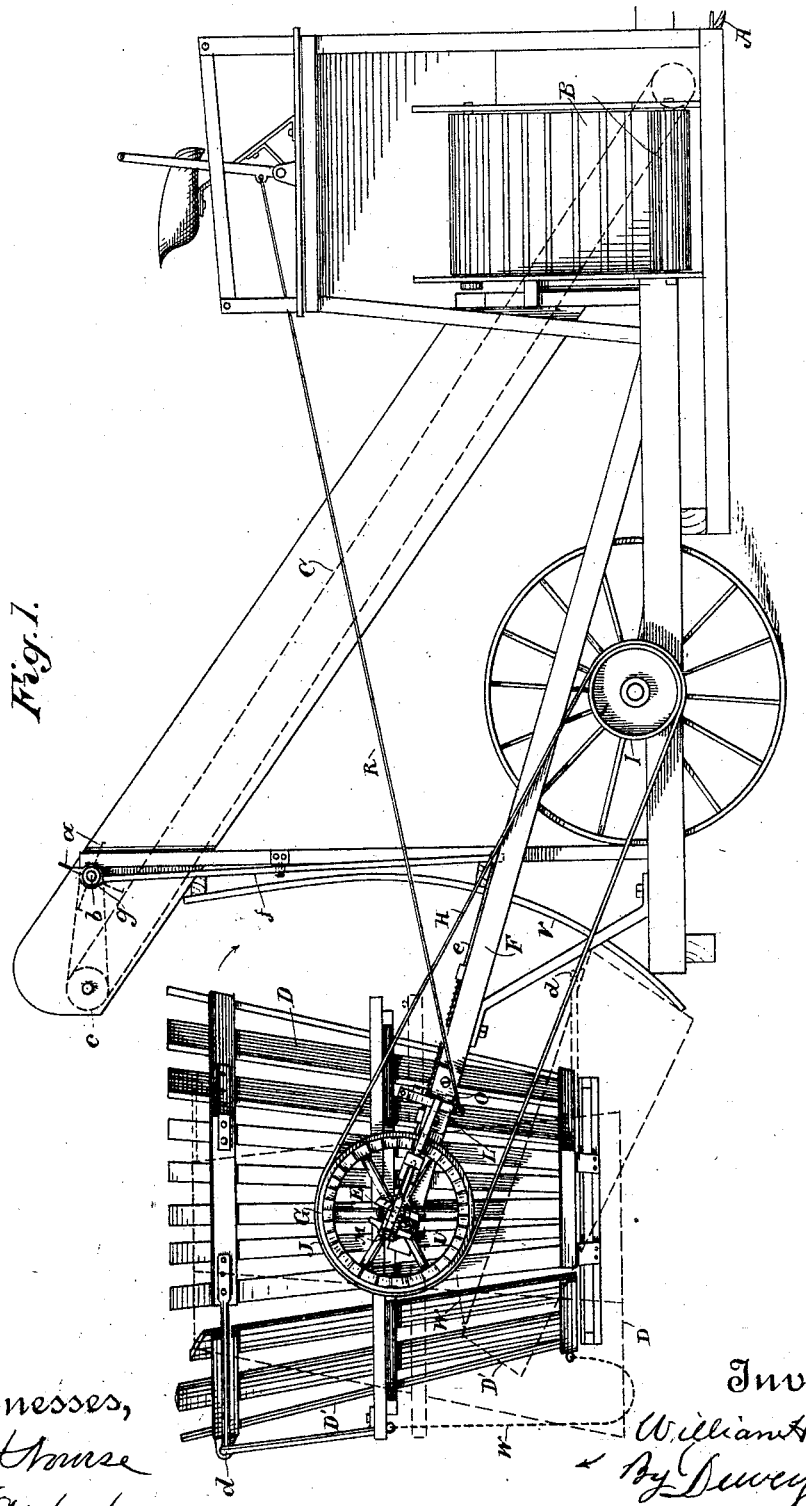

(No Model.) 2 Sheets—Sheet 1.

W. H. FRAZINE.
HAY COCKING MACHINE.

No. 603,816. Patented May 10, 1898.

Witnesses,
Inventor
William H. Frazine
By Dewey & Co.
Att'ys (No Model.) 2 Sheets—Sheet 2.
W. H. FRAZINE.
HAY COCKING MACHINE.
No. 603,816. Patented May 10, 1898.
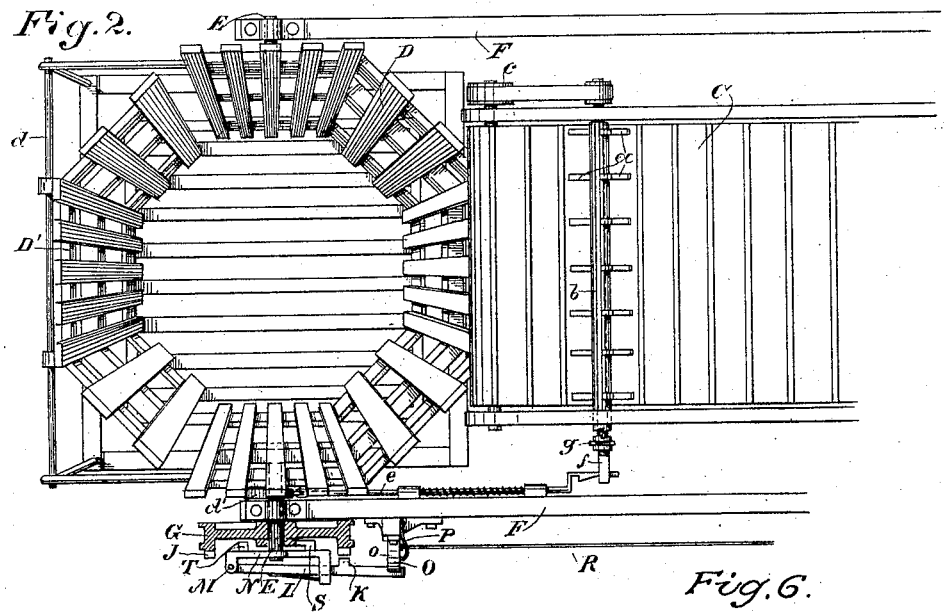
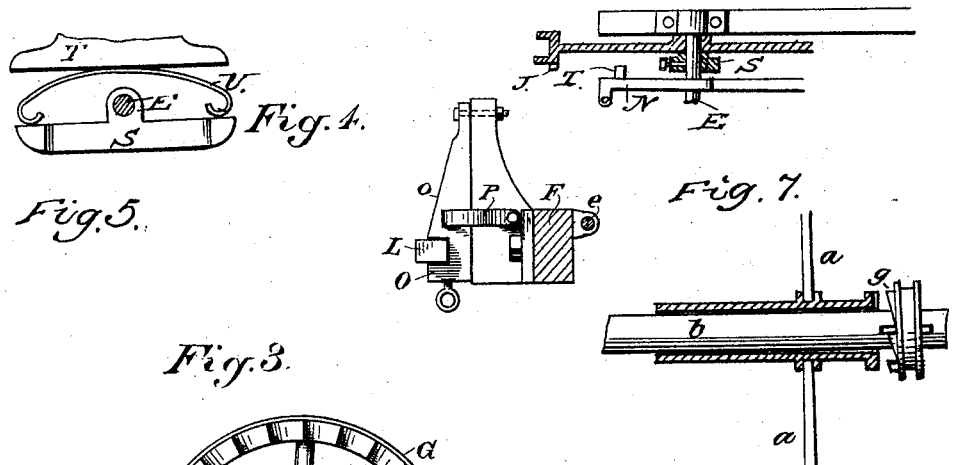
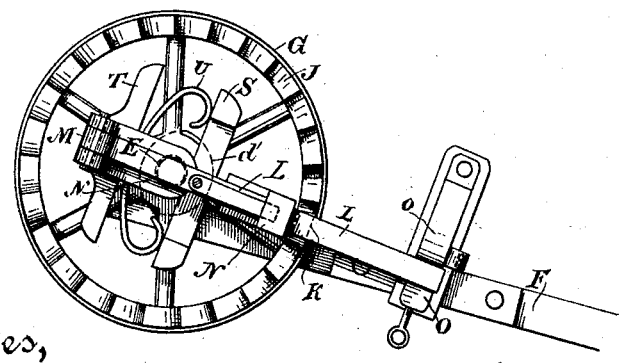
Witnesses,
Inventor
William H. Frazine
By Dewey & Co.

UNITED STATES PATENT OFFICE.

WILLIAM H. FRAZINE, OF MONTPELLIER, CALIFORNIA.

HAY-COCKING MACHINE.

SPECIFICATION forming part of Letters Patent No. 603,816, dated May 10, 1898.

Application filed September 13, 1897. Serial No. 651,441. (No model.)

*To all whom it may concern:*

Be it known that I, WILLIAM H. FRAZINE, a citizen of the United States, residing at Montpellier, county of Stanislaus, State of California, have invented an Improvement in Hay-Cocking Machines; and I hereby declare the following to be a full, clear, and exact description of the same.

My invention relates to an apparatus for cocking hay; and it consists in details of construction, which will be more fully explained by reference to the accompanying drawings, in which—

Figure 1 is a side elevation of my machine. Fig. 2 is a plan view of the rear end of the same. Fig. 3 is a detail view of the basket-operating device. Fig. 4 is a side view of the releasing device. Figs. 5, 6, and 7 are enlarged details to be referred to.

The object of my invention is to provide an improved apparatus for cocking hay, and especially for collecting the loose cut grass, so that it may be deposited in heaps and properly shaped and made smooth at each deposit.

The devices for cutting the grass are represented by the mowing-machine A. This has a horizontal traveling carrying-belt B at the rear of the cutting-knives, which transports the cut grass, and by the incline at the inner end the cut grass may be elevated and either deposited directly into the receiver (which in such cases would be suspended at the side of the machine opposite to the sickle and in such position as to be easily seen by the driver) or, as in the present illustration, the cut grass is delivered upon a rearwardly-traveling inclined carrying-belt C, from which it is delivered into the receiving-basket D, which is shown in Fig. 1 as being journaled and suspended just behind and below the rear end of this carrying-belt. The basket D is suspended upon trunnions E, which are suitably journaled upon the frame-timbers F, extending rearwardly from the main machine in suitable position for this purpose. Mounted upon one end of the trunnion-shaft is a loosely-running pulley G, which receives power through a belt H from another pulley I upon the main portion of the machine, whereby the pulley G is constantly rotated while the machine is traveling. Projecting from one edge of this pulley or fixed to revolve therewith is a ratchet-wheel J, the teeth of which are adapted to engage with a lug K upon a spring-pressed lever L, one end of which is hinged in lugs M upon a bar N, which extends transversely across and is supported on the trunnion-shaft E, before described. The end of the lever L which is opposite to its hinge or fulcrum point is adapted to engage with a movable latch O, suitably fulcrumed, so as to swing into and out of engagement with the end of the lever L. A spring P presses upon this latch to hold it normally in engagement with the end of the lever L, and when it is thus engaged the lug K is held out of engagement with the ratchet-teeth J. Under these conditions it will be manifest that the pulley G and the ratchet-wheel J can be allowed to rotate continuously while the machine is in motion without communicating any movement to the basket D, which remains in an upright position and will continue so until filled or until the driver disengages the latch O from the lever L, and thus allows the lug K of said lever to fall into the ratchet-teeth J.

The disengagement of the latch O is effected by means of a cord R, which connects with the free end of the latch and extends to a point within reach of the driver, so that by pulling upon this cord the latch will be swung about its pivot or otherwise moved out of engagement with the lever L. The spring which presses upon this lever immediately forces it down, so that the lug K falls into the path of the moving ratchet-teeth J, and this carries the lever L, and with it the bar N, causing them to revolve with the ratchet. As the bar is secured to move with the trunnion-shaft by which the basket is carried, it will be manifest that these movements will rotate the basket about its supporting-axis and will reverse it, so as to discharge its contents. As soon as the revolution is complete and the basket returned to its upright position the lever L, moving over the inclined surface o of the latch O, (the latter having been meanwhile released and allowed to return to its normal position,) will drop into the notch of the latch and will thus be moved so as to carry the lug K out of the line of the teeth J, and this will allow the basket to stop, while the ratchet-wheel still continues its rotation.

As the basket has considerable weight, its tendency will be to continue its movement, and the abrupt stoppage of the parts after the revolution of the basket has ceased would bring considerable strain upon the trunnion-shaft and connected parts. In order to relieve this strain, I have shown a hub fixed to the shaft E, having arms S projecting in each direction, as shown in Fig. 5, and approximately radial across the pulley G and interior to the ratchet-teeth J. Parallel with this, upon the opposite side of the hub, is another arm T, which is fixed to the arm or bar N, (see Fig. 6,) and between the two bars S and T is a spring U, which normally retains the two in their essentially parallel position. When the basket, having completed a revolution, is stopped by the reëngagement of the arm L with the latch O, the momentum and effort to continue its movement will be transmitted to the spring U, thus compressing the spring between the arms S and T, and this allows the arm S, which is connected with the basket-trunnion, to oscillate backward and forward until the basket comes to a state of rest, thus relieving the strain upon the rigid parts.

V is an essentially vertically disposed guide-rack formed of light open slats bent into a segment with approximately a radius from the trunnion-shaft to the basket, and this rack lies in such position that as the basket begins to reverse its open top moves in close relation with the rack and thus prevents any discharge of the contents until the basket is actually reversed.

The rear side D' of the basket is hinged or suspended from its upper edge, so that the bottom may swing inwardly about this hinge-support, and it is controlled and prevented from swinging too far by means of a connecting-rope W, which is attached to it, as shown. The action of this hinged swinging side will be as follows: When the basket is in its vertical position, adapted to receive the cut grass, this side remains in its normal position with relation to the remainder of the basket, one side of which it forms. As soon as the basket begins to turn for the purpose of discharge the weight of the lower edge of this side will cause it to rest upon and follow the grass as the latter begins to discharge from the basket after the basket is reversed, and it thus assists to force the grass out of the basket. At the same time as the machine continues to move forward this movable side remains for an instant on the top of the heap or cock of grass and holds it in place until it comes to rest, and thus prevents its top being dragged off by its forward momentum, so as to make a ragged pile. In other words, this side serves to smooth and finish the top of each cock after it has been deposited on the ground. As the basket continues to revolve and returns to its normal position this swinging side will fall by gravitation to its place in readiness for the basket to be again filled.

In order to prevent the loss of a certain amount of grass which might be discharged from the elevator or carrier C by its continued motion while the basket is revolving, I have shown a temporary stop or check to retain the grass within this elevator and until the basket has again returned to its upright position. This check consists of a picker or plate $a$, which is mounted upon a sleeve loosely turnable upon the shaft $b$. This picker is normally engaged with the shaft, which is rotated by means of a belt from a pulley $c$ upon a convenient portion of the apparatus, and while the carrying-belt C is moving the picker $a$ is in engagement with the shaft $b$, and is thus caused to rotate in unison with the movements of the carrier C, so that the grass passing beneath it upon this carrier will not be impeded in its movements. As soon as the basket commences to rotate for the purpose of discharging its shaft acts upon a cam or eccentric $d'$, which is mounted thereon, and through a connecting-rod $e$ it actuates a bell-crank lever $f$, which in turn engages one member of a clutch $g$, Fig. 7. This clutch is thus caused to engage its members, and as one part is stationary and the other is connected with the sleeve upon which the picker $a$ is mounted the latter will be caused to stop its rotation by the engagement of the clutch, and will thus stand in such position across the carrying-belt C that it will temporarily prevent the grass being carried on by this belt. The grass will thus collect behind this picker $a$ as long as it remains in a stationary condition; but as soon as the basket has returned to its upright position the cam $d'$ will act through its connections to disengage the clutch members $g$, and the picker will thus be allowed to again revolve with the shaft $b$, thus releasing the temporarily-checked grass and allowing it to pass over into the basket.

As described in the first part of this specification, the basket may, if preferred, be placed in line with the carrying belt or draper B, so that the latter will discharge directly into the basket, in which case the latter will be suspended at the side of the machine in line with the sickle-bar and nearly at the side of the driver. This position may in some cases be found more convenient, because the basket can be more easily inspected by the driver than when at the rear; but the essential operation of the mechanism will be the same in either case.

Having thus described my invention, what I claim as new, and desire to secure by Letters Patent, is—

1. The combination in a hay-cocking machine of the sickle-carrying belts or drapers and a normally vertically disposed basket suspended upon trunnions so as to receive the grass discharged from the carrying-belt, said basket having a side loosely pivoted at the top whereby the bottom is allowed to press upon the contents of the basket by gravitation as the basket revolves, a pulley loosely mounted upon the trunnion-shaft, a ratchet-wheel carried by the pulley, a spring-pressed lever-arm connected with the trunnion-shaft having a lug adapted to engage with the ratchet, a latch whereby the lever is raised and the lug maintained normally out of engagement with the ratchet-teeth, and a device within the control of the driver by which the lever may be disengaged from the latch and allowed to engage the ratchet whereby it and the trunnion-shaft are rotated and the basket reversed and discharged.

2. A vertically-disposed basket mounted upon a trunnion-shaft and adapted to receive grass which is delivered from the sickle of a mowing-machine, said basket having a side loosely pivoted at the top whereby the bottom is allowed to press upon the contents of the basket by gravitation as the said basket revolves, a pulley loosely turnable upon the trunnion-shaft and continuously rotated by connection with a movable part of the main machine, a ratchet-wheel carried by said pulley, an arm extending across and connected with the basket-trunnion, a spring-pressed lever having one end hinged to said arm and a lug upon the lever adapted to engage with the ratchet, a latch by which the free end of the lever-arm is normally raised and the lug held out of engagement with the ratchet, with a device within the reach of the driver whereby the latch may be disengaged and the lever dropped to allow the lug to engage the ratchet whereby the basket is revolved and discharged, said latch upon its release being returned into the path of the lever so as to again raise it and disengage the lug when the basket has reached its upright position.

3. A basket suspended upon a trunnion-shaft and adapted to receive cut grass from the conveying-belt of a mowing-machine, a continuously-rotating pulley and ratchet-wheel carried thereby mounted upon the trunnion-shaft, an arm supported upon the outer end of said shaft with lugs to which one end of a spring-pressed lever is fulcrumed, a lug upon said lever adapted to engage the teeth of the ratchet, a movable latch by which the lug is normally held out of engagement with said teeth, means for disengaging the latch to allow the lug to engage the teeth whereby the trunnion-shaft and basket are revolved, a hub fixed upon the trunnion-shaft having an arm extending across it from side to side, a corresponding arm fixed to the lever-supporting bar extending parallel with the first-named arm, a spring between said two parallel arms whereby the basket is allowed to oscillate when brought to a state of rest after its revolution is completed, and the strain upon the parts is relieved.

4. A basket mounted upon trunnions adapted to receive cut grass from the carrying-belt of a mowing-machine, mechanism for rotating the basket, an arc-shaped rack fixed to the machine so that the open mouth revolves against the arc and the contents are prevented from escaping until the basket is entirely reversed, said basket having the side opposite to the rack loosely pivoted at the top whereby as the basket revolves said side presses upon the contents by gravitation and assists in forcing said contents out of the basket.

5. The basket suspended upon trunnions adapted to receive grass from the carrying-belts of a mowing-machine, mechanism by which said basket is periodically revolved to discharge its contents and return to a vertical position, a side of said basket being hinged at the top whereby its opposite end is permitted to swing inwardly and is adapted to press upon the contents thereof by gravitation when the basket is reversed whereby the heap is smoothed and pressed into shape, and means for limiting the swinging movement of said side.

6. A basket mounted upon trunnions and adapted to receive the cut grass from the carrying-belts of a mowing-machine, mechanism by which the basket is periodically revolved so as to discharge its contents and return it to its normal upright position, an essentially vertically disposed fixed arc or segment against which the mouth of the basket moves during the first half of its rotation until it is in position to discharge upon the ground, and a side of the basket loosely pivoted at the top whereby the bottom is allowed to press upon the contents of the basket by gravitation as the basket revolves from the upright to the reverse position, and to be returned to its normal position as the basket leaves it and returns to its upright position.

In witness whereof I have hereunto set my hand.

WILLIAM H. FRAZINE.

Witnesses:
J. E. WARD,
G. R. STODDARD.